United States Patent [19]
Rodgers et al.

[11] Patent Number: 5,550,939
[45] Date of Patent: Aug. 27, 1996

[54] HIGH SPEED OPTICAL SWITCHING DEVICE INCLUDING A CAPACITANCE STRUCTURE

[75] Inventors: Paul M. Rodgers, Woodbridge; David G. Moodie, Ipswich; David Wake, Levington, all of England

[73] Assignee: British Telecommunications public limited company, London, England

[21] Appl. No.: 318,620

[22] PCT Filed: Apr. 13, 1993

[86] PCT No.: PCT/GB93/00762

§ 371 Date: Oct. 7, 1994

§ 102(e) Date: Oct. 7, 1994

[87] PCT Pub. No.: WO93/21554

PCT Pub. Date: Oct. 28, 1993

[30]    Foreign Application Priority Data

Apr. 13, 1992 [GB] United Kingdom ............. 9208104

[51] Int. Cl.$^6$ ................................................. G02B 6/10
[52] U.S. Cl. ............................ 385/8; 385/2; 385/14
[58] Field of Search ........................ 385/1–4, 7, 8, 385/11, 9, 16, 14, 129–132; 359/320, 139

[56]    References Cited

U.S. PATENT DOCUMENTS

| | | | |
|---|---|---|---|
| 4,770,483 | 9/1988 | Ridgeway | 385/2 X |
| 4,867,515 | 9/1989 | Normandin | 385/1 |
| 5,067,828 | 11/1991 | Sullivan et al. | 385/3 |
| 5,082,342 | 1/1992 | Wight et al. | 385/8 |
| 5,191,630 | 2/1993 | Tajima | 385/122 |
| 5,404,412 | 4/1995 | Seino et al. | 385/2 |

OTHER PUBLICATIONS

Mak et al, "High–Speed Bulk InGaAsP–InP Electroabsorption Modulators with Bandwidth in Excess of 20 GHz", IEEE Photonics Technology Letters, vol. 2, No. 10, pp. 730–733.

LinkamWa et al, "130 ps recovery of all–optical switching in a GaAs multiquantum well directional coupler", Appl. Phys. Lett. 58(19), pp. 2055–2057.

Primary Examiner—Rodney B. Bovernick
Assistant Examiner—Hemang Sanghavi
Attorney, Agent, or Firm—Nixon & Vanderhye P.C.

[57]    ABSTRACT

A high speed optical switching device includes a waveguide arrangement, incorporating a pn junction, with a large bondpad for the purposes of increasing the capacitance presented by the device. Data and control signals can be input at an input port of the waveguide arrangement, presence of the control signal operating to modify the optical path length of the device for the data signal. By incorporating the device in an interferometer arrangement, or by exploiting a Fabry-Perot cavity of the device, it can be used to transmit the data signal selectively, for instance so as to demultiplex a time multiplexed optical communications signal. The high capacitance provides a very short recovery times so that data rates of 10 GHz and substantially above can be accommodated.

13 Claims, 3 Drawing Sheets

1.56 μm SIGNAL CALIBRATED RELATIVE TO THE 1.3 μm SIGNAL (dB)

HIGH SPEED OPTICAL SWITCHING DEVICE INCLUDING A CAPACITANCE STRUCTURE

BACKGROUND OF THE INVENTION

1. Field of the Invention

The present invention relates to optical switching devices and finds particular application in high bit rate communications links.

2. Related Art

Communications links which can carry high data rates are advantageous because they can transmit increased levels of information and/or can provide links via a single physical connection which service higher numbers of customers. For instance, time division multiplexed signals on a communications link can provide a higher number of time slots, and potentially therefore service a higher number of customers, where the link itself carries a higher data rate.

In order to access the data on a communications link, it is necessary to down load the information on the link to a receiver. In time division multiplexing, one particular customer will require information from only one or more selected time slots to be down loaded. To do this, switching devices may be used, the speed of switching of the device being commensurate with the capability of the link for carrying high speed traffic. In optical communications, it is envisaged that data rates may be achieved as high as 100G bits/s in the foreseeable future. This might be carried in ten time slots, providing ten channels at 10G bits/s.

As well as potentially increasing the number of customers using a communications link, ultra high bit rate links in future networks may enable customers to be offered new large bandwidth services as well as giving telecommunications companies greater flexibility in managing their networks. The present invention is concerned with an important part of achieving ultra high bit rate links, providing a type of switch capable of demultiplexing a 10G bit/s bit stream from a 100G bit/s optical time division multiplexed (OTDM) signal. An optical clock signal might be used to switch out every tenth bit. Hence, to recover all the data on the link, ten switching devices might be used in parallel.

Switching devices are known, including switching devices which can be controlled by an optical input. For instance, in "130 ps" Recovery of All-optical Switching in a GaAs Multi Quantum Well Directional Coupler" published in Applied Physics Letters volume 58 number 19 on 13th May 1991 by Li Kam Wa et al (Ref. (i)), a recovery time of 130 ps is reported in a zero gap directional coupler using multiple quantum wells. However, it has now been discovered in making the present invention that much faster recovery times can be achieved. Reduced recovery times provide potentially faster switches, recovery time being a limiting factor.

SUMMARY OF THE INVENTION

According to the present invention, there is provided a semiconductor optical switching device, for use in optical communications systems operating at high data rates, the switching device comprising an optical waveguide, including a p-n junction, provided on a substrate, the waveguide having input and output ports for receiving a data signal at a first wavelength from a communications link and a control signal at a second wavelength, the control signal operating to modify the refractive index of at least part of the waveguide at the first wavelength, by creating electrical carriers in the region of the p-n junction, so as to change the optical path length of the data signal in the device there being significant capacitance across the device in use.

The purpose of the significant capacitance is to sweep carriers out of the region of the junction as quickly as possible after their creation by input of the control signal to the device. This is achieved because the significant capacitance provides a low impedance recombination path for photogenerated carriers, thus speeding up the recovery of the device, and therefore its potential switching speed.

Although the data and control signal need not both be guided through the device, so that for example the data signal could be guided by the waveguide while the control signal is input at right angles to the waveguide and is not guided by it, preferably both the data and control signal are guided along the waveguides. This facilitates easy alignment of the device, particularly if the data and control signal share the same input and output port to the waveguide.

Preferably the significant capacitance of the device enables in use a substantially constant potential to be maintained across the p-n junction. This is desirable because it is this potential which provides the driving force to sweep the carriers out of the junction region.

Furthermore the significant capacitance of the device preferably facilitates recombination of an AC component of the electrical carriers within the device. Hence by arranging for recombination to occur within the device the potentially long delays encountered when allowing recombination to occur outside of the device, due for example to high AC impedance of the bondwire, can be avoided.

A suitable capacitance can be achieved by providing a higher bondpad capacitance than would be used in known devices of similar structure. For instance, the latter may have a capacitance of the order of 0.5 pF across the junction and a bondpad capacitance of 0.1 pF or less. Indeed, in known devices the aim is to reduce the capacitance presented. Devices according to the present invention might, in contrast, present a capacitance in use in the range of, say, 5 pF to 50 pF. For instance, under a reverse bias of 5 volts, the junction alone might provide a capacitance ($C_d$) of 0.6 pF, but the switching device as a whole, including the bondpad capacitance, might present a capacitance ($C_{ext}$) of 23 pF.

The junction can be provided as a PIN junction, absorption of light at the second (control) wavelength giving rise to electron hole pairs (EHP) as carriers.

Particularly useful signal and control wavelengths might be 1.55 μm and 1.3 μm, these being commonly used in optical communications and sources of light at these wavelengths being readily available.

A switching device according to an embodiment of the present invention can be used as a switch by periodically (selectively) transmitting or blocking the signal wavelength. This might be achieved by putting the device into one arm of a Mach-Zehnder interferometer, or by constructing the device to comprise a Fabry-Perot (FP) cavity, or a directional coupler.

BRIEF DESCRIPTION OF THE DRAWINGS

Specific embodiments of the present invention will now be described, with reference, by way of example only, to the accompanying drawings of which.

DETAILED DESCRIPTION OF EXEMPLARY EMBODIMENTS OF THE INVENTION

Figure 1:
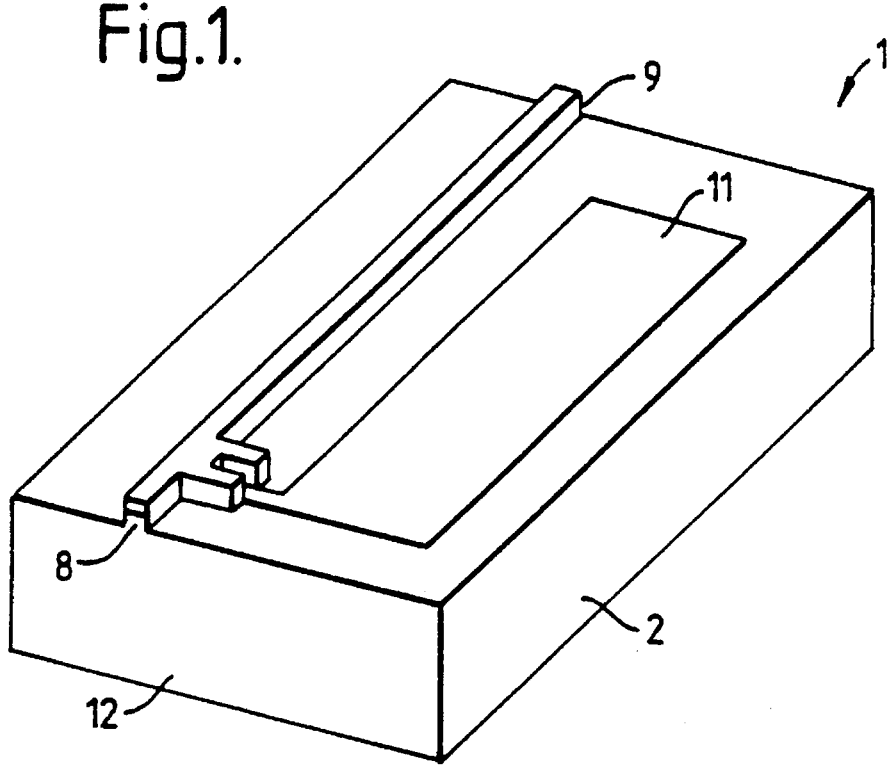
FIG. 1 shows a perspective view of a demultiplexing (DEMUX) chip according to an embodiment of the present invention.
Figure 2:
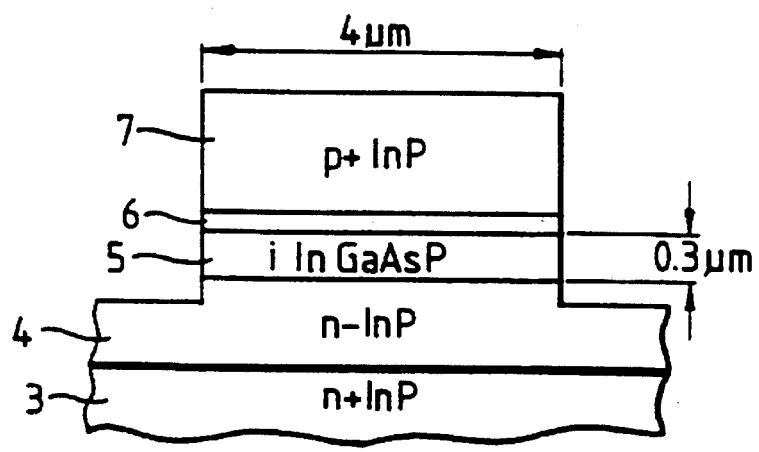
FIG. 2 shows a cross section of the waveguiding region of the chip of FIG. 1.

Referring to FIGS. 1 and 2, an embodiment of the present invention comprises a PIN waveguide device structure 1, designed to demultiplex a 10G bit/s bit stream from a 100G bit/s OTDM signal at 1.55 μm wavelength. Such a switching device might then be used as a DEMUX chip with an optical clock signal of 1.3 μm wavelength, the clock signal being used to switch out, for instance, every tenth bit of the 100G bit/s signal.

The PIN waveguide device structure 1 is grown by MOVPE growth techniques, these being known and not consequently further described herein. The structure is based on a Sn doped InP substrate 2. The layers grown onto the substrate are as follows, in order:

i) $2\times10^{18}$ cm$^{-3}$ S doped n$^-$ InP layer 3 index matched to the substrate, ii) $3\times10^{17}$ cm$^{-3}$ S doped n$^-$ InP buffer layer 4;

(iii) 0.30 μm quaternary (Q) 1.44 layer 5;

(iv) 0.18 μm undoped InP layer 6;

(v) $8.3\times10^{17}$ cm$^{-3}$ Zn doped p$^+$ InP layer 7.

Referring particularly to FIG. 1, input and output ports 8, 9 are provided as facets at either end of the waveguiding structure. Absorption of 1.3 μm light in the Q1.44 guiding layer 5 gives rise to EHPs and an associated change in the refractive index (Δn) of this layer 5 for 1.55 μm light. The transmitted intensity at 1.55 μm can then be optically controlled by putting the device 1 into a Mach-Zehnder interferometer type of arrangement or by relying on a Fabry-Perot cavity. Ultra high speed operation is made possible by using the new approach of on chip recombination of swept EHPs, discussed in further detail below. The change in refractive index, Δn, is due to effects of band filling, band gap shrinkage and free carrier absorption, discussed in the following two papers:

Ref (ii) "Carrier-Induced Change in Refractive Index of InP, GaAs and InGaAsP" IEEE Journal of Quantum Electronics, volume 26 number 1 January 1990 by Bennett et al Ref (iii) "InP/GaInAsP Guided-Wave Phase Modulators based on Carrier-induced Effects, Theory and Experiment" Journal of Lightwave Technology volume 10 number 1 January 1992 by Vinchant et al.

Practical details of operation of the embodiment of the present invention shown in the Figures are as follows:

Pulse Energy Required For Switching:

Besides having the potential for integration with other devices operating in the 1.3 μm or 1.55 μm telecommunications windows, using InGaAsP lattice matched to InP is advantageous in that its bandgap can be chosen such that Δn will be maximised for a given wavelength. The bandgap wavelength of 1.44 μm was selected to give a large value of Δn due to the close proximity of this wavelength to 1.55 μm, whilst maintaining an acceptably small absorption coefficient. For this choice of bandgap the dominant contribution to Δn is expected to be bandfilling, with the band-gap shrinkage and free carrier absorption processes being smaller and of opposite polarities to one another (see Ref. (ii) above). From consideration of the bandfilling effect alone a proportionality constant relating Δn to the free carrier density of approximately $5\times10^{-20}$ cm$^{-3}$ is theoretically predicted (see Ref. (iii), above). A high finesse FP cavity is then used to convert this phase modulation into intensity modulation of 1.55 μm light. This was accomplished by applying facet coatings at the input/output ports 8, 9 of reflectivity 84% of 1.55 μm and 8% at 1.3 μm. When these coatings were applied to a device of length 540 μm a 9.1 dB contrast ratio was achieved by tuning through the FP spectrum. The estimated contrast ratio obtained when 1 pJ of 1.3 μm light is coupled into the device is calculated to be 6.1 dB using the proportionality constant above and standard FP theory (Ref. (iv): "Simple and Accurate Loss Measurement for Semiconductor Optical Waveguides" Electronics Letters Vol. 21 pp 581–583 by R G Walker).

Device Switching Speed:

An initial investigation of the free carrier induced Δn using undoped waveguides indicated that free carriers have a lifetime of approximately 8 ns for this material system. In the working device this free carrier lifetime needs to be reduced to <10 ps in order to facilitate 100G bits$^{-1}$ operation. For practical purposes the turn-on time can be considered to be instantaneous compared to the switch-down time. By the application of sufficient reverse bias between the p-contact (bondpad) 11 and n-contact (metallized substrate) 12, an electric field can be established across the depleted guiding layer 5, 6 resulting in removal of EHP at a rate determined by their transit times out of this layer. If we assume that the saturated carrier velocities of electrons and holes have the same value as in InGaAs $7\times10^6$ cms$^{-1}$ and $5\times10^6$ cms$^{-1}$ respectively, then all carriers will be removed from the depletion region in <10 ps with the mean carrier transit time being 4.4 ps (Ref. (v): "GaInAsP Alloy Semiconductors" by T P Pearsall, published by Wiley 1982).

Figure 3:
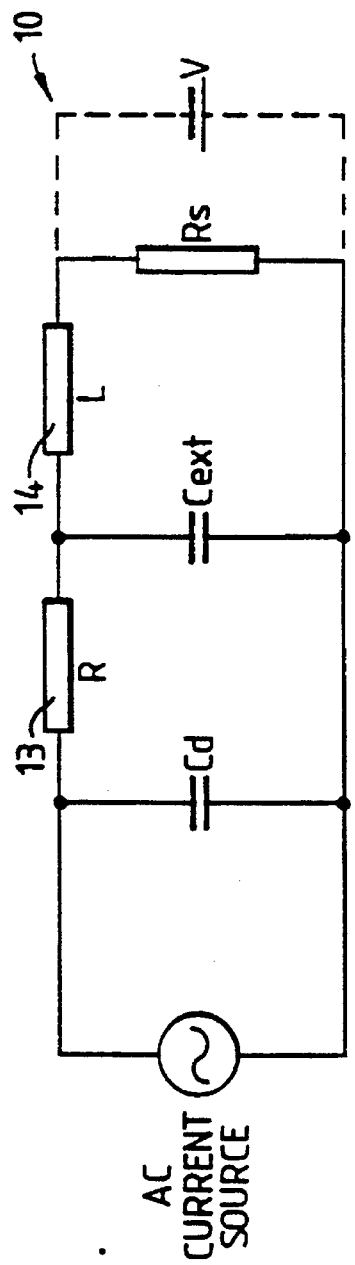
FIG. 3 shows a circuit model of the DEMUX chip of FIG. 1.

The idea of reverse biasing an optical switch to sweep carriers out of its guiding region has been reported before (see Ref. (i) above). By reverse biasing an MQW structure carriers were swept out of the guiding region to bring the recovery time down to 130 ps. However the device structure reported here is significantly different in the following two ways. Firstly we are employing a bulk semiconductor guiding layer. As a consequence of this generated carriers don't have to tunnel through barriers and hence are not slowed down on their way out of the guiding layer. The second and more fundamental divergence relates to the current pulse that is initiated by the removal of EHP from the depletion region. When the carriers are swept out at their saturated carrier velocities this current pulse will be of several hundred mA in magnitude. At impedance above a few ohms, it can be seen that potentials of several volts could be generated across the external circuit in opposition to the bias voltage. The DEMUX chip and bias current can be represented by the circuit element model 10 shown in FIG. 3. When under a reverse bias of 5 V the pin junction has a leakage current of 370 pA and a capacitance Cd=0.6 pF. The resistance 13 associated with the path from the metallized ridge to the bondpad 11 is approximately R=1.6Ω. The large area bondpad 11, fabricated using a 0.1 μm SiNx dielectric layer, has a capacitance at −5 V of $C_{ext}$=23 pF. When the 1.3

μm clock pulse has a repetition rate of 10 GHz the current generated will consist of a DC component in addition to AC components going up to in excess of 100 GHz in 10 GHz steps. DEMUX chips were bonded to laser headers to facilitate the application of a bias voltage. There will inevitably be a bondwire inductance L, 14, of several nH acting in series with various external resistances R. As long as R is less than a few ohms the DC component of the current will recombine off chip without dropping the junction potential by a significant amount. The case is different for the AC components due to the large impedance of the bondwire at these frequencies. This necessitates on chip recombination which is made possible by the high value $C_{ext}$. For the value given above assuming that any inductance in series R is of negligible size, 100G bits$^{-1}$ operation is predicted for low reverse voltages.

The idea of increasing the bondpad capacitance to improve high speed performance is directly opposite to the approach required for photodetectors and electrooptic modulators, and is what sets this device apart from previous work.

Figure 4:
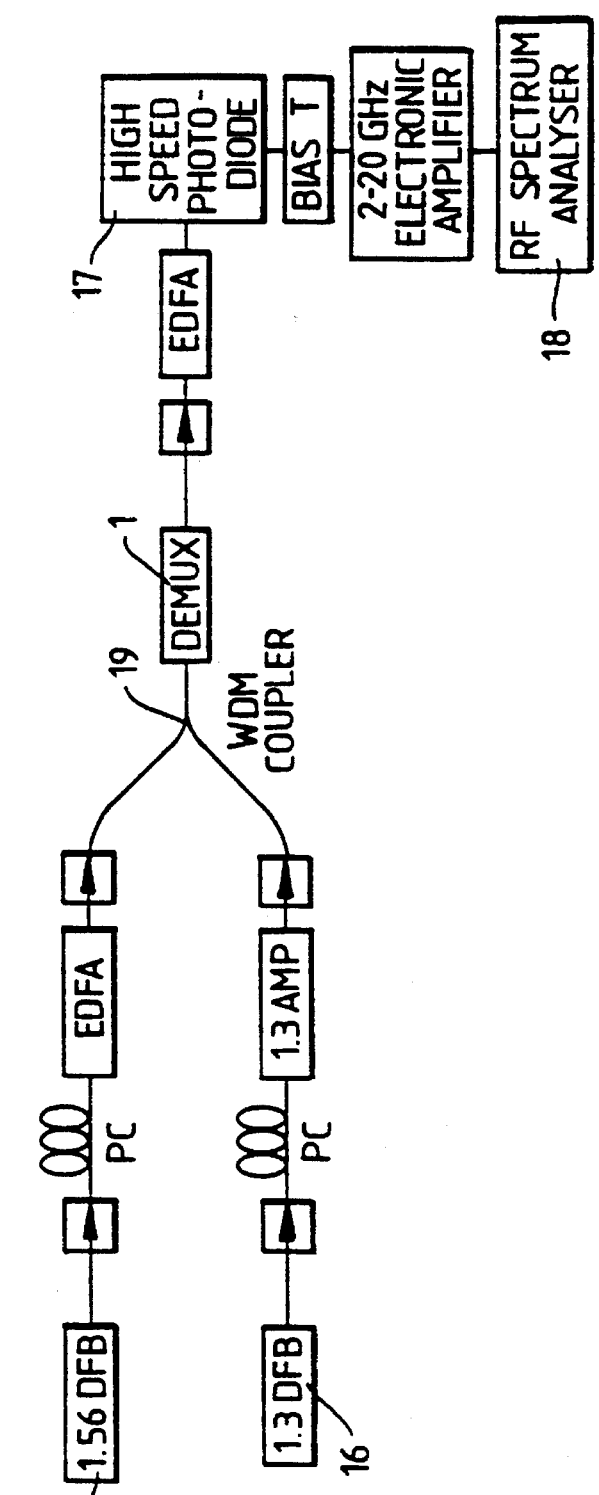
FIG. 4 shows an experimental arrangement for investigating operation of the DEMUX chip of FIG. 1.

Experiment:

Using the lay-out shown in FIG. 4, a CW beam from a 1.56 μm DFP 15 was wavelength tuned so that the transmitted TE mode from the reverse biased DEMUX chip 1 was roughly at a point in its FP spectrum where the change in transmitted intensity for small Δn was optimised. This beam was then modulated in the DEMUX chip 1 by amplified 1.3 μm pulses of approximately 25 ps FWHM duration obtained by gain switching a DFB 16 at a 1 GHz repetition rate. The signal was detected by a high speed pin photodetector 17, amplified, and then displayed on an rf spectrum analyser 18. At each frequency the signal level was calibrated against the 1.3 μm signal at that frequency. The spectrum of the 1.3 μm pulse was observed by connecting the output of the WDM coupler 19 to the high speed pin 17. Measurements were conducted in the frequency domain because in the time domain using this source the response would be dominated by the spectral components outside the range of interest.

Figure 5:
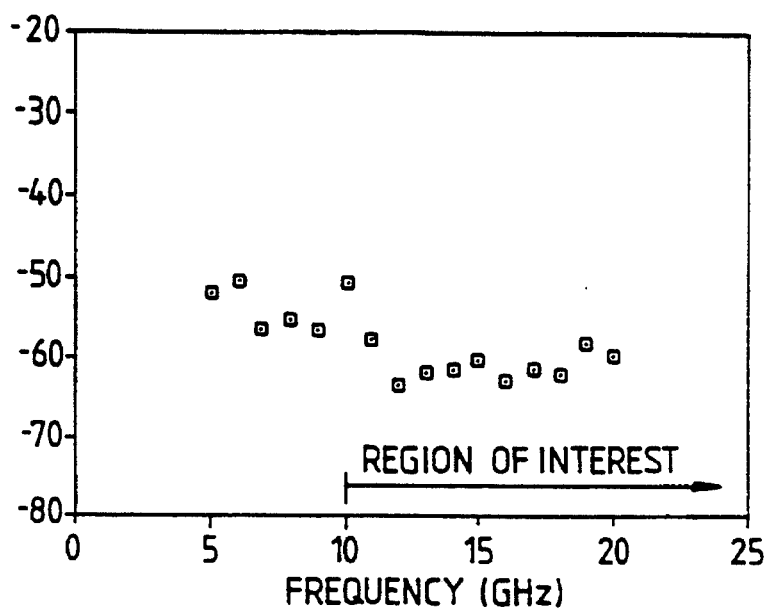
FIG. 5 shows experimental results obtained with the experimental arrangement of FIG. 4, in particular the measured ratio of the optically modulated signal to an optical modulating signal.

Results and discussion:

With the DEMUX chip 1 under a 1 V reverse bias optical modulation was observed at frequencies up to 20 GHz. Using this measurement approach there was a restriction imposed by the spectrum of the 1.3 μm pulse which falls off at around 20 GHz. The measured ratio of the 1.5 μm signal to the 1.3 μm signal is displayed in FIG. 5. It can be seen that in the frequency range of interest (>10 GHz) the ratio of the modulated to modulating signal remains approximately constant. Since the impedance of the current recombination path varies with frequency, this suggests that over this frequency range the impedance is sufficiently low so as not to slow the free carriers down from their saturated carrier velocities. The observed optical modulation of the 1.56 μm signal is larger by a factor of 5 than that theoretically predicted from the level of the 1.3 μm signal if a mean carrier lifetime of 4.4 ps and a Δn proportionality constant of $5 \times 10^{-20}$ cm$^3$ are assumed. Below 10 GHz the ratio of modulated to modulating signal increases with decreasing frequency. This has yet to be accurately modelled, but it is believed to be related to the higher recombination path electrical impedances at these frequencies. If the impedance of the path between Cd and $C_{ext}$ could be made to be negligible, then this design could function as an oil optical wavelength converter besides its envisaged role as a demultiplexer.

DEMUX chips using the novel swept carrier technique could be used to demultiplex an ultra fast bitstream by employing either the high finesse FP cavity technique or the more familiar Mach-Zehnder approach. When the FP cavity method is employed the amount of energy required in the switching pulse is less. However the linewidth of the 100G bits$^{-1}$ bitstream will be at least 0.8 nm which is not negligibly small in comparison with the spacing of adjacent maxima of the DEMUX FP spectrum. This fact when taken into consideration alongside the requirement to keep the mean photon lifetime in the cavity down to values less than the bit period implies that there is little benefit to be accrued from reducing the device length or absorption loss to values below those reported here.

Figure 6:
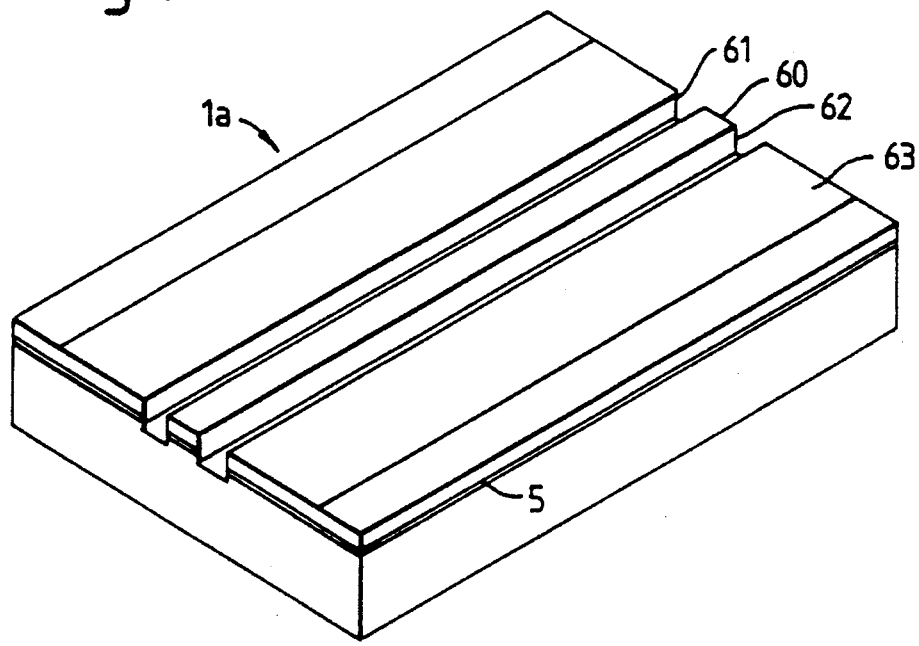
FIG. 6 shows an alternative embodiment of a DEMUX chip for use in the present invention.

Referring to FIG. 6, an alternative form of DEMUX chip for use in embodiments of the present invention comprises a ridge 60 flanked by a double channel arrangement 61, 62. The upper surface of the chip 1a is metallized 63 on top of a thin (1000 Å) nitride layer. Electrical contact is made to the ridge region only. The layer structure is otherwise the same as that shown in FIG. 1.

The double channel structure may be used with a variety of channel etch depths, for instance, or other variations. An example is that etching could stop part of the way through, or above, the guiding layer 5.

The form of DEMUX chip shown in FIG. 6 has a particularly simple structure and is thus easily fabricated with high yield.

We claim:

1. A semiconductor optical switching device, for use in optical communications systems operating at high optical data rates, the switching device comprising:

an optical waveguide, including a p-n junction, provided on a substrate, the optical waveguide having input and output ports for receiving an optical data signal at a first optical wavelength from a communications link and an optical control signal at a second optical wavelength, the optical control signal operating to modify the refractive index of at least part of the waveguide at the first optical wavelength, by creating electrical carriers in the region of the p-n junction, so as to change the optical path length of the data signal in the device, there being capacitance structure which provides significant capacitance substantially in excess of 0.6 pf across the device in use.

2. A device according to claim 1, wherein both the optical data and optical control signal are guided along the optical waveguide.

3. A device according to claim 1, wherein the significant capacitance of the device enables, in use, a substantially constant reverse-bias potential to be maintained across the p-n junction.

4. A device according to claim 1, wherein the significant capacitance of the device, in use, facilitates recombination of an AC component reverse-bias p-n junction current due to the electrical carriers within the device.

5. A device according to claim 1 wherein said optical switching device has a recovery time of not more than 100 psecs.

6. A device according to claim 1 wherein said optical switching device has a recovery time of not more than 10 psecs.

7. A device according to claim 1 wherein the significant capacitance of the optical switching device is provided by a large area bondpad.

8. A device according to claim 7 having a ridge structure flanked on each side by a channel, wherein:

said waveguide is located within the ridge structure, and said large area bondpad is provided substantially over the whole of the ridge structure and channels.

9. A device according to claim 1 wherein said significant capacitance has a value of at least 5 pF.

10. A device according to claim 1 wherein said high optical data rates comprise modulation at frequencies of 10 GHz and above.

11. A device according to claim 1 wherein said optical waveguide is within a Fabry-Perot cavity.

12. A device according to claim 11, wherein the facet reflectivity of the Fabry-Perot cavity is greater than the first optical wavelength than at the second optical wavelength.

13. A demultiplexing arrangement, for use in demultiplexing time division multiplexed optical communications signals, comprising an optical switching device according to claim 1.

* * * * *